United States Patent Office 3,116,356

Patented Dec. 31, 1963

3,116,356

METHODS OF PRODUCING HOMOGENEOUS POLYAMIDE PRINTING PLATE SUPPORTS

Hans Hoerner, Munich-Unterhaching, and Bjoern Olsen, Ludwigshafen (Rhine), Germany, assignors to Badische Anilin- & Soda-Fabrik Aktiengesellschaft, Ludwigshafen (Rhine), Rheinland-Pfalz, Germany No Drawing. Filed Jan. 28, 1959, Ser. No. 789,489
Claims priority, application Germany Jan. 31, 1958
6 Claims. (Cl. 264—322)

This invention relates to polyamide plates and especially to polyamide plates which are homogeneous, free of stress, have a smooth surface and uniform thickness. More particularly, the invention relates to the production of polyamide plates and especially to polyamide plates which are useful as carriers for photographic films or which may be used for the production of printing forms in photomechanical processes.

It is already known to use polyamides for the production of printing forms. The material employed for this purpose consists of a mixture of a polyamide and a photosensibilizing agent. Another known possibility for the production of printing forms consists in treating polyamide plates with a solution containing a photo-sensibilizing agent, by which treatment the polyamide is swelled and made receptive to the sensibilizing agent. As sensibilizing agents there are used for example chromate, azo or iron compounds. After the polyamide plates have been sensibilized they are exposed in the manner usual in the photographic art, for example beneath a stencil. The unexposed portions are then washed out with a solvent or a swelling agent, e.g. in a centrifuge, or removed by rubbing out with a soft brush or a velvet cloth while the exposed portions of the plates remain unaffected by the swelling agent. Solvents or swelling agents suitable for washing out the unexposed portions are for example low-molecular aliphatic alcohols, alone or in admixture with water.

The polyamides used for the production of plates or films to be employed as printing forms are usually interpolyamides, that is, polyamides prepared from at least two different compounds forming linear polyamides. For the working up of these interpolyamides to plates or films several known methods may be applied. For example, the plates or films may be produced from the melt by the casting, pressing, or extrusion methods. Until the present invention, the polyamide structures used for the production of printing forms and carriers for photographic films by photomechanical methods have always had certain shortcommings and the results have never been wholly satisfactory. In order that plates or films may be employed for such purposes, it is essential that they should be absolutely homogeneous and free of stress. Furthermore, they should exhibit a smooth surface and uniform thickness. The exacting requirements placed upon such plates or films regarding all these properties have never been fully satisfied. For example, the polyamide plates prepared according to conventional methods have never been fully homogeneous. Because of internal structures, which appear in the developing these plates or films have only limited suitability as printing forms or carriers for photographic films. Apart from this, the plates are not free from stress, which necessarily results in the plates warping or being distorted when they come into contact with solvents or water, however small this stress may be. This effect of water or solvents on plastics, and in particular polyamides, is well known and plastics, particularly polyamides, are therefore often tested on the presence of stress by bringing them into contact with water or solvents. A further disadvantage of the conventional type plates is that their surface is not smooth to the necessary extent and their thickness insufficiently uniform. In the production of photographic films or printing forms from polyamide structures these defects have presented many difficulties and sometimes these structures have been quite unsuitable. The process according to the present invention now provides a possibility of producing plates and films of polyamides which are homogeneous, free of stress, exhibit a smooth surface and uniform thickness and which fulfill the exacting requirements placed on plates or films to be used as printing forms or carriers for photographic films.

The objects of the invention are accomplished by a process which comprises subjecting structures of polyamides, which have been obtained by methods known per se, to a treatment with swelling agents and pressing them at a temperature between 40° C. and the melting point of the interpolyamide without substantially affecting the dimensions of the article.

Prior to this invention the art has already been aware of the possibility of forming polyamides which have been treated with solvents or swelling agents, at temperatures below the melting point of the polyamides. However, it has not been known that flat structures of polyamides, which have been obtained by conventional methods, can be made so homogeneous and free of stress that they become suitable for printing and photographic purposes, by simply pressing them, without substantially affecting their dimensions, at a temperature between 40° C. and the melting point of the polyamide.

A useful type of interpolyamide for the preparation of flat structures to be treated by the method according to our invention can be prepared by polycondensation of at least two different compounds forming linear polyamides. In the mixture of monomers, none of the polyamide-forming components should be present in an amount less than 10% by weight, based on the weight of the other polyamide-forming components. If diamine salts of dicarboxylic acid are used, they should be regarded as only one component of the mixture. Suitable compounds are for example, interpolyamides from hexamethylene adipamide and caprolacetam, or from hexamethylene adipamide, caprolactam and dicyclohexylmethane adipamide. The polyamides may also contain hereto atoms in the molecule, for example, oxygen atoms or include side chains, for example, aliphatic radicals such as alkyl groups. For the preparation of the flat structures to be treated by the process according to our invention there may also be used the so-called polyurethanes, i.e., the linear polyaddition products from diisocyanates and diols.

The subject matter according to the present invention does not extend to the preparation of the unprocessed plates or films used in the practice of our invention and no claim is made thereto.

In carrying out the invention, the usual practice is to treat the polyamide plates or films with swelling agents and to press them in the heat, at temperatures below the melting point of the particular polyamide, in order to make them suitable for use as printing forms or for photographic purposes.

As swelling agents we prefer aliphatic and cycloaliphatic mono-, di-, and trihydroxy compounds having up to 10 carbon atoms in the molecule, such as for example, methanol, ethanol, propanol, ethylene glycol, 1,4-butanediol, glycerin, 1,3,4-butanetriol or cyclohexanol, and also water. Mixtures of these hydroxy compounds, both by themselves and in admixture with water, frequently give particularly good results.

Polyethylene oxides having a polymer chain length of up to 100 are also suitable as swelling agents. In admixture with the said compounds there may also be used liquid halogen-carbon compounds such as carbon tetrachloride or tetrachlorethylene or liquid hydrocarbon halides, for example, chloroform, ethylene chloride, trichlorethylene or liquid aromatic compounds, such as benzene, toluene and xylene. The treatment of the plates or films depends on the swelling or dissolving action of the liquids or mixtures of liquids used. Working may be at room temperature or elevated temperature, for example, at the boiling temperature of the liquid or mixture of liquids, and may be continued for a few minutes or several hours. For example, the treatment is rather long and is preferably carried out at elevated temperature when there is used water or liquids which are strongly diluted with water. On the other hand, treatment for 1 minute at room temperature may be sufficient when alcoholic liquids of comparatively high concentration of alcohol are used. If necessary, the surface of the plates or films, which has partly been dissolved, may be removed. The plates or films may then advantageously be pressed at relatively high pressures of up to about 50 kg./cm.$^2$. The pressure applied should in all cases exceed the vapor pressure of the swelling agent at the working temperature. The pressure should preferably lie between 10 and 40 kg./cm.$^2$. With a polyamide plate which has been treated with ethyl alcohol a pressure of 10 kg./cm.$^2$ at a temperature of 150° C. is sufficient. The plates or films may be pressed in presses of conventional design between faultless metal plates, with or without a frame. The pressing temperatures should lie between 40° C. and the melting point of the polyamide, i.e., generally between about 170° and 190° C. Like the pressures, they depend on the type of swelling agent used. The preferred temperature range is between about 20° and 100° C. below the melting point of the polyamide, i.e., between about 70° and 170° C.

The process according to the present invention provides a way of refining plates or films which contain a sensibilizing agent. Furthermore it is possible first to refine the plates or films and then to sensibilize them, by treating them with a solution which contains a sensibilizer which makes the polyamide receptive to the swelling agent. Since the refined plates or films are completely free of stress, they do not warp as a result of this sensibilizing treatment. A further advantage is that the removal of the unexposed parts proceeds especially quickly and with equally good results over the whole surface. There appear no internal structures, since the plates or films are absolutely homogeneous. The embossed contours of the printing forms thus obtainable are very sharp and prints of excellent quality are obtained. Printing forms obtained by the process according to the present invention are suitable for a very great number of prints, e.g., several hundred thousand copies.

The following examples give some of the methods in which the invention may best be performed, but it is to be understood that the invention is not restricted to these examples. The parts specified in the examples are parts by weight.

*Example 1*

An interpolyamide consisting of caprolactam, hexamethylene adipamide and dicyclohexylmethane adipamide is pressed at 170° C. into a plate 1.2 mm. in thickness, without having regard to smoothness of the surface or absence of stress in the material. The plate thus obtained is then stored for a minute at room temperature in a bath consisting of 7 parts of methanol, 2 parts of benzene and 1 part of water. The plate is then taken out from the bath, and the partly dissolved surface is removed. While still moist, the plate is pressed for ten minutes at 90° C. between preheated metal plates without a frame. The pressure applied is about 15 kg./cm.$^2$. There is thus obtained a plate about 1.1 mm. in thickness having a somewhat larger area. After the swelling agent has evaporated, the plate is transparent, practically free of stress and eminently suitable as a printing form.

*Example 2*

An unprocessed plate of the type described in Example 1 is stored for 2 hours in a boiling mixture of 90 parts of water and 10 parts of methyl alcohol. The plate is then pressed for 5 minutes at 110° C. in a 1 mm. frame between faultless metal plates at a pressure of 35 kg./cm.$^2$. There is obtained a plate which is free of stress and exhibits an absolutely smooth surface. It may be sensibilized with a solution of chromate in aqueous methanol or acetone and lends itself for use as a printing form.

*Example 3*

An unprocessed plate of the type described in Example 1 is stored for an hour in water of 90° C. It is then pressed for 4 minutes at 140° C. in a 1 mm. frame at a pressure of 20 kg./cm.$^2$. The internal structure, which had been clearly recognizable before the treatment owing to the transparency of the plate, has disappeared. The surface is smooth and the plate is free of stress. It is well suited for use as a printing form.

*Example 4*

An unprocessed pressed plate 1.2 mm. in thickness which has been prepared from an interpolyamide made up of 60 parts of hexamethylene adipamide and 40 parts of caprolactam is stored at room temperature for 24 hours in a bath consisting of ethanol and water in a proportion of 2:8. The swollen plate is then pressed for 6 minutes at 130° C. in a 1 mm. frame between highly polished metal plates. The plate thus obtained is free of stress. It may be sensibilized and exposed and shows no internal structure when the unexposed parts are removed.

*Example 5*

An unprocessed plate of the type described in Example 4 is stored in boiling water for 12 hours. It is then pressed between smooth metal plates at 160° C. and a pressure of 15 kg./cm.$^2$. The plate thus obtained is free of stress, exhibits an absolutely smooth surface and lends itself admirably as a printing form.

We claim:

1. A process for the production of a homogeneous polyamide plate free of stress which is suitable for use as a photographic printing plate after impregnation with a photosensibilizing chromium compound, which process comprises: bringing a polyamide swelling agent selected from the group consisting of water-soluble alcohols, water and mixtures thereof into contact with an unprocessed plate produced from the melt of an interpolyamide consisting essentially of a plurality of polycondensed compounds, said compounds being capable of forming an alcohol-swellable linear interpolyamide condensation polymer containing recurring carbonamide groups in the chain, each compound being present in an amount of at least 10% by weight with reference to the total weight of said compounds; and pressing the plate thus treated in a press at a pressure between about 10 and about 50 kg./cm.$^2$ at temperatures between 40° C. and the melting point of the interpolyamide without substantially affecting the dimensions of said plate.

2. The process as claimed in claim 1 wherein said interpolyamide is formed from caprolactam, hexamethylene adipamide and dicyclohexylmethane adipamide.

3. The process as claimed in claim 1 wherein said interpolyamide is formed from caprolactam and hexamethylene adipamide.

4. The process as claimed in claim 1 wherein the swelling agent is in admixture with a member selected from the group consisting of liquid hydrocarbon halides and liquid aromatic hydrocarbons.

5. The process as claimed in claim 1 wherein the pressnig is carried out at a temperature of between 70 and 170° C.

6. The process as claimed in claim 1 wherein the pressure during the pressing is in the range between 10 and 40 kg./cm.$^2$.

References Cited in the file of this patent

UNITED STATES PATENTS

| | | |
|---|---|---|
| 2,216,735 | Carothers | Oct. 8, 1940 |
| 2,299,839 | McQueen | Oct. 27, 1942 |
| 2,307,846 | Miles | Jan. 12, 1943 |
| 2,312,913 | Kirby | Mar. 2, 1943 |
| 2,321,047 | Salzberg | June 8, 1943 |
| 2,365,416 | Kuhne | Dec. 19, 1944 |
| 2,484,529 | Roedel | Oct. 11 1949 |